E. A. BARBET.
PROCESS AND APPARATUS FOR THE RECOVERY OF ETHER AND ALCOHOL VAPORS CONTAINED IN THE AIR OF FACTORIES.
APPLICATION FILED OCT. 4, 1916.
1,326,432.
Patented Dec. 30, 1919.
3 SHEETS—SHEET 3.
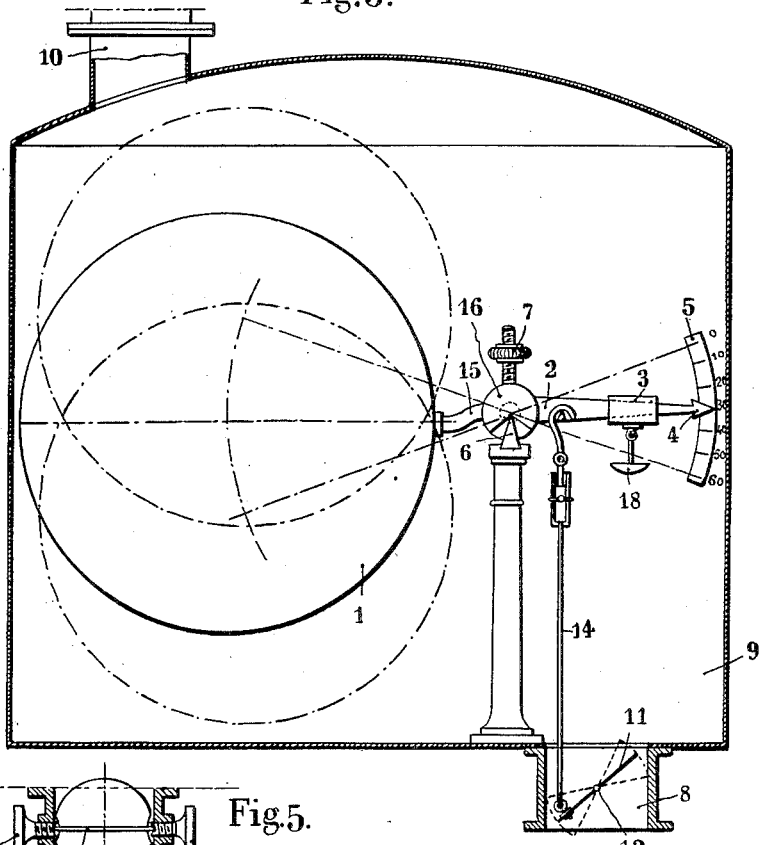
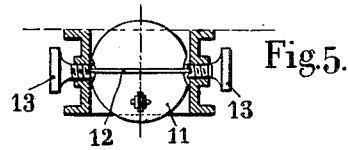
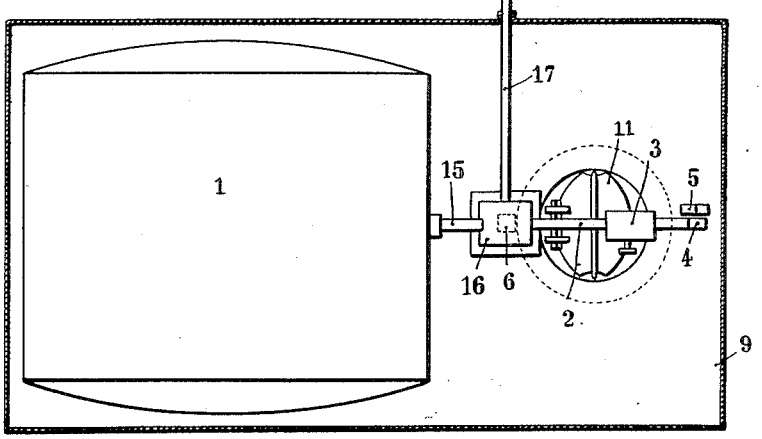

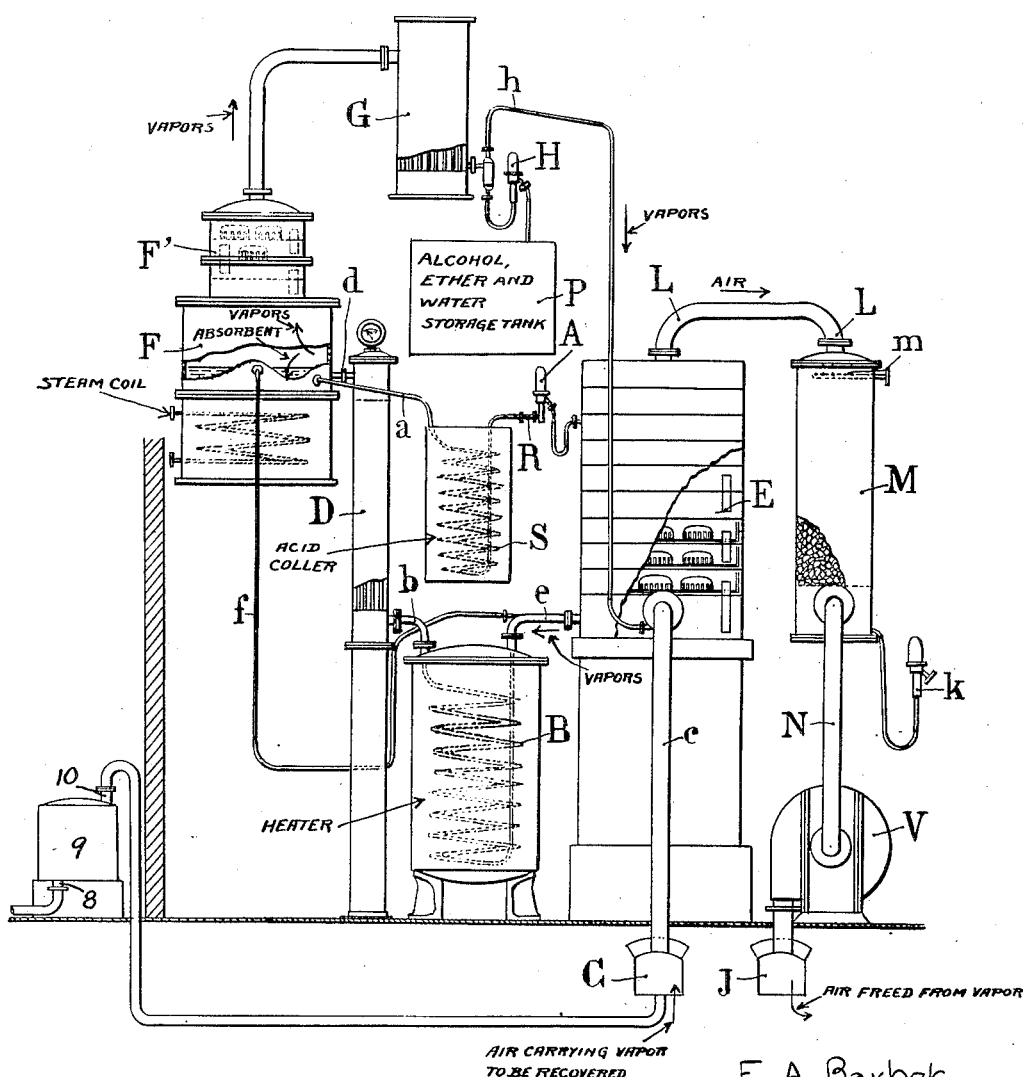

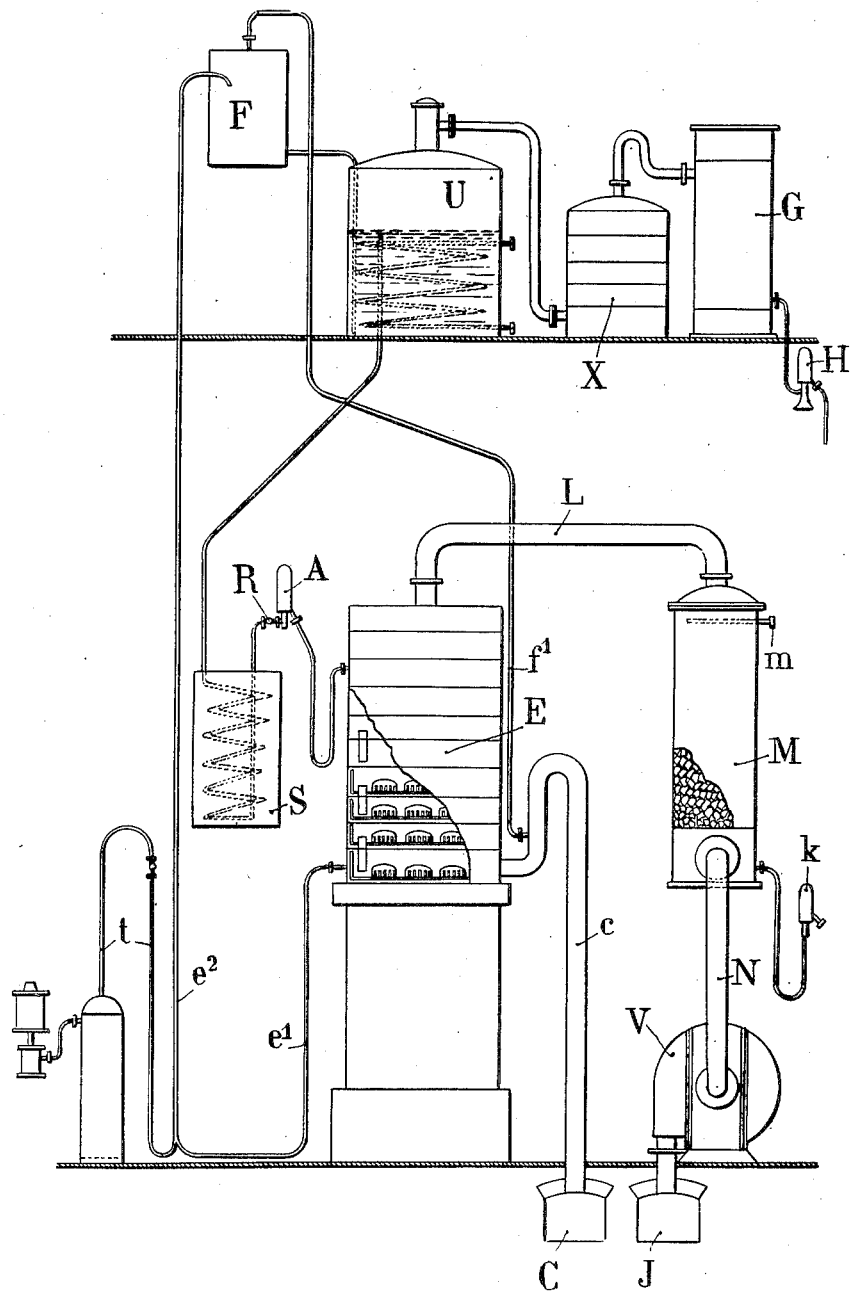

UNITED STATES PATENT OFFICE.

EMILE AUGUSTIN BARBET, OF PARIS, FRANCE.

PROCESS AND APPARATUS FOR THE RECOVERY OF ETHER AND ALCOHOL VAPORS CONTAINED IN THE AIR OF FACTORIES.

1,326,432. Specification of Letters Patent. Patented Dec. 30, 1919.

Application filed October 4, 1916. Serial No. 123,797.

*To all whom it may concern:*

Be it known that I, EMILE AUGUSTIN BARBET, a citizen of the French Republic, residing at 5 Rue de l'Echelle, Paris, France, have invented certain new and useful Improvements in Processes and Apparatus for the Recovery of the Ether and Alcohol Vapors Contained in the Air of Factories, of which the following is a specification.

This invention has for its object to provide an improved process and apparatus for the recovery of the ether and alcohol vapors contained in the air in factories, such as, gunpowder works, artificial silk works, etc.

The improved method consists in drawing the air charged with the vapor that is to be recovered into an absorption column wherein the said air comes in intimate contact with dilute sulfuric acid which retains the ether and alcohol vapors.

The acid charged with these substances is raised to the upper stage constituting a vaporizer preferably in a continuous manner, as in the form of an emulsion, or by any suitable mechanical means. The ether and the alcohol are recovered by partial distillation. The acid now poor in ether, but not entirely exhausted, is cooled and reintroduced into the absorber and thus may be re-used indefinitely, so that it is always again capable of being returned to the top of the absorber in order to be again charged with vapors of ether and alcohol. The improved process, by due selection of the degree of dilution of the acid, can be so operated as to recover the alcohol and ether in the same ratio as that in which they were present in the air, or not, as desired.

The accompanying drawings illustrate by way of example the general arrangement of an improved apparatus for carrying the improved process into effect.

In these drawings:—

Figure 1 is a diagrammatic elevation of the apparatus, (parts being shown in section).

Fig. 2 is a similar view of a slightly modified arrangement of the apparatus.

Figs. 3 and 4 are respectively an elevation and a plan of a densimeter for regulating the admission of the air into the apparatus in accordance with its richness in the vapors that are to be recovered.

Fig. 5 shows a detail thereof.

Referring first to Fig. 1, the air charged with ether and alcohol arrives through the flue C and enters by the pipe $c$ at the bottom of the absorbing column E. This plate-column which is similar to distilling columns, is built of materials that are resistant to acids, namely, the plates are made of perforated lead, the tubes are made of sheet iron lined with lead, or of sandstone or lava, and the hoods are made of lead or porcelain, etc. The air bubbles up through the acid wherein it gives up the vapors of ether, alcohol, and water which it contains.

The purified air issues from the top at L and passes into the water washer M which is designed to keep back any traces of acid that may have been carried over in the air. This washer M contains a coke or other suitable filling, which is continually sprinkled with water (containing some lime) through the perforated pipe ring $m$.

This water passes out through the testing device $k$ where it is ascertained whether the acidity has been sufficiently neutralized by ingredients of the wash water, including $Ca(OH)_2$ or $Ca(HCO_3)_2$.

The air after having been duly de-acidified can then be allowed to pass, without untoward effects on the mechanism, to the suction fan V, which produces a draft sufficient to compel the air to bubble up through the acid in the column E. The air finally escapes into the atmosphere by way of the flue J.

The acid mixture whose hourly volume, temperature and density are constantly controlled by means of the leaden testing device A before entering the absorber E, passes to the top of the latter and descends from plate to plate whereby it becomes systematically enriched with ether and alcohol.

This acid mixture passes continuously out at $e$ and thence to the bottom of a leaden worm located in a sheet iron boiler B. The acid mixture is heated gradually in the first turns of the worm, and at last reaches boiling point, so that it issues with violence from the leaden pipe $b$ in the form of an emulsified mass of acid, steam, alcohol and ether, and enters the bottom of a tube vessel (heat exchanger) D.

The heater B may be replaced by any other device of the worm type wherein the acid is outside of the worm, and the steam is inside of the worm; or a heat exchanger having leaden tubes may be employed instead of the heater B.

The heat exchanger D contains only a rather small number of leaden tubes of small diameter for the purpose of raising the acid to the top of the heat exchanger by emulsion-action. This heat exchanger D need not be heated; the abundant steam generated in the heater B being sufficient to cause the rise of the liquid.

The emulsified mixture flows out through the leaden pipe $d$ into the separators F, F'.

The vapors of ether, alcohol and the steam pass over the plates in the upper separator F' where they are caused to bubble up through a slightly alkaline solution which breaks up any traces of sulfovinic acid that may have been carried over. Thence the said vapors and steam flow to the cooling condenser G, and thence to the testing device H, and finally to the storage tank P. The latter thus contains a recovered raw product, the three constituents of which, namely, ether, alcohol and water are further to be separated from one another in a suitable rectifier not shown. The ether vapors that are not condensed in the condenser G are returned through the pipe $h$ to the absorber E.

The acid that has ascended continuously in the separator is subjected to a further heating in the base F of the said separator. A leaden steam worm by ebullition produces a more thorough expulsion of the ether and alcohol and a suitable re-concentration of the acid. A thermometer will allow, as in etherizing boilers, of controlling the degree of concentration of the acid, according to the temperature of the latter.

This acid although impoverished in its content of ether and alcohol, need not necessarily be entirely exhausted. It issues from the separator F through a leaden pipe $a$ on its way to the cooler S fitted with a leaden worm, wherein it is cooled and thence rises to the testing device A before being admitted into the absorber E. This cooling of the acid is required for the purpose of imparting to it a great capacity for absorption.

It is advisable to have an abundant circulation of acid, but there should be no excess over the requirements, because the greater the volume of acid, the greater will be the consumption of steam in the boiler B for causing the ebullition of the acid, and the greater will be the amount of water used in the cooler S for cooling the acid.

A cock R is located in front of the testing device A, for the purpose of controlling the flow of acid back into the absorber E. The excess of acid that is unable to pass through this controlling cock R, will pass out from the vessel F through an overflow $f$ which returns the hot acid residue into the pipe $e$ and consequently to the inlet of the boiler B.

If, on the contrary, it is desired to increase the rapidity of the rise of the acid enriched with ether, this result may be effected by causing a thin stream of water to trickle in the tubular coil of B and at the base of the latter, alternatively crude ether from the testing device H could be so employed. The re-concentration of the acid back to the desired degree is effected by the supplementary heating of the acid in the base of the separator F, as hereinabove described.

The relative proportions of ether and alcohol contained in the air may be preserved in the recovered liquid, by adjusting the dilution of the acid entering the absorber and consequently controlling the temperature at which the distillation is effected. The greater the dilution, the greater will be the quantity of alcohol, and the smaller will be the amount of ether recovered by the distillation.

In the modification shown in Fig. 2 the rise of the acid is effected by an emulsion with compressed air.

In this modification the acid charged with ether or alcohol, issuing from the base of the absorber E, flows down through the downward branch of the siphon $e'$, and compressed air is injected through a pipe $t$ just above the base of the rising branch $e^2$ for the purpose of lifting the acid in the form of slugs, interspaced with air. The acid is thereby raised sufficiently to enter the separator F. The acid flows out of this latter into the distilling boiler U, while the air issuing at $f'$ returns to the base of the absorber E.

The lead-lined sheet iron boiler U is fitted with leaden steam worms for effecting the de-saturation of the acid with ether. The acid issues therefrom continuously and passes into a leaden cooler S, whence it returns to the absorber E. The cycle has thus been completed.

The ether vapor given off in the boiler passes over the plates of the saturator X, whence it passes into the cooling condenser G, and thence to the testing device H.

As will be understood, without departing from the spirit of the invention, for effecting the necessary circulation of the acid, other means than those specified above may be employed.

Most workrooms wherein ether and alcohol vapors are given off, present difficulties in the way of collecting the said vapors. In some workrooms the ventilation is so copious as to render the percentage of vapors in the air extremely small, whereas other workrooms are not sufficiently ventilated, so that the collection of the vapors is not complete.

It is useless to provide each workroom with a hand-controlled damper, unless the workpeople have a standard, and such a standard can only be furnished by an analysis of the air.

The apparatus illustrated in Figs. 3, 4 and 5 is designed to provide an automatic regulation; it is mounted on the suction duct of each workroom.

The presence of ether vapor which is very heavy of itself, increases the density of the air in which it is contained, and it is this different density which is utilized in the said apparatus.

1 is a float of a densimeter immersed in the air to be analyzed. The interior of this float is in permanent communication with the outside by a means hereinafter described. It is necessary that the barometric pressures shall be the same inside and outside the densimeter so as not to give wrong indications. The float 1 is made of the lightest possible materials, such as, for instance, celluloid, cardboard, very smooth thin aluminium, etc. Its surface must be air-tight.

The float is mounted on one end of the beam 2 of a Roman steelyard with a sliding weight 3; the other end of the beam is sharpened to a point 4, movable over a graduated scale 5. The beam rests on a steel knife-edge 6, the top of which is located only very slightly above the center of gravity of the apparatus in order to render the balance as sensitive as possible. 7 is a nut for raising and lowering the center of gravity, as in all balances.

The position of the sliding weight is so adjusted that when in pure air the pointer 4 will be opposite the zero mark at the top of the graduated scale.

The ether-laden air enters at 8, spreads in the casing 9 containing the apparatus, and escapes through an upper duct 10. The cross-sectional area of the casing 9 is such that the air loses almost all its velocity; this being essential in order that the position of the densimeter shall not be appreciably affected by such velocity.

If the pure air in the casing is replaced by air laden with ether, the densimeter will rise in accordance with the Archimedean principle, and the pointer 4 will gradually move down past the graduation marks of the scale 5.

This indication will enable the workman to regulate the opening of a butterfly damper located in the inlet duct 8.

If desired, the arrangement may be improved by causing the balance beam itself to act upon the damper, provided the damper is balanced very exactly, and care is taken to reduce rotary friction to practically *nil*.

An improved arrangement of this kind is shown by way of example in Fig. 3. In this example the damper 11 is mounted on an axle 12 terminating in two steel pointed ends engaging in suitable bearings right and left. 13 are screws for enabling the rotational movement to be regulated to any desired degree of ease. The damper is connected to the balance beam 2 by means of a very light connecting rod 14 whose length has been determined by direct experiment. The damper is required to open to a further extent when the densimeter float 1 is raised by a greater degree of density of the ether-laden air.

The permanent communication between the interior of the float 1 and the pure air of the atmosphere outside the workroom, notwithstanding the relative movements of the float, is assured by the following means:—

For this purpose the left hand portion of the balance beam is constituted by a tube 15 connected at one end to the float 1 and at its other end to the central portion of the beam, this central portion being composed of a frame of steel tubing 16 reinforced at its underside. Into the back (as shown in Fig. 4) of the frame 16 there is screwed a steel tube 17 in exact line with the knife edge 6. This tube 17 is carried to the outside through the back of the casing 9 in which the tube 17 is mounted so as to rock on its own axis when the balance beam is tilted. Through this tube 17, frame 16, and tube 15, the interior of the float 1 is kept in permanent communication with the outside atmosphere.

If it is desired to dispense with this small complication of the apparatus, the analysis will be falsified by the barometrical changes. However, since these changes will affect equally all the automatic apparatus of this kind located throughout the factory, the respective extents of opening of the several dampers will remain fairly in proportion to one another. If necessary, small adjusting weights determined for every 5 or 10 millimeters variation of the barometric indication, may be placed in the small dish 18 (Fig. 3).

Instead of the centrifugal fan V, an extractor of the Roots type, or any suitable pump may be employed. Also, instead of the fan being located to produce suction at the outlet of the absorber E and the washer or scrubber M, it may be located to act as a blower between the duct C and the absorber E.

Having now described my invention what I claim as new and desire to secure by Letters Patent is:—

1. A process for the recovery of the ether and alcohol vapors contained in the air of factories, such as gunpowder works, artificial silk works, etc., which consists in absorbing the said vapors in dilute sulfuric acid, distilling the acid thus charged with ether and alcohol, separating the distilled vapors of ether and alcohol from the acid, condensing the separated vapors of ether and alcohol, slightly concentrating the residual acid, cooling the concentrated acid, returning the cooled acid for absorption of fresh vapors of ether and alcohol, and regulating the degree of dilution of the absorbing acid for the purpose of varying at will the relative proportions of the recovered ether and alcohol.

2. A process for the recovery of the ether and alcohol vapors contained in the air of factories, such as gunpowder works, artificial silk works, etc., which consists in bringing the air charged with said vapors into intimate and systematic contact with dilute sulfuric acid which absorbs the said vapors, heating the mixture of acid, ether and alcohol, utilizing the phenomenon of emulsification for raising continuously said mixture, reheating the said mixture for disengaging the vapors of ether, alcohol and water and slightly concentrating the acid therein, separating the greater portion of said vapors from said acid and condensing said greater portion for subsequent fractionation by rectification, cooling a portion of the residual acid which has been impoverished in, but not entirely exhausted of, its content of ether and alcohol, returning said impoverished acid into contact with air laden with ether and alcohol vapors, varying at will the desired proportion of ether and alcohol in the recovered mixture by regulating the degree of dilution of the absorbing acid, effecting said regulation by adjusting the temperature of reconcentration of the impoverished acid, and regulating the volume of air to be treated in accordance with its percentage of contained ether and alcohol.

3. A process for the recovery of ether and alcohol vapors contained in the air of factories, such as gunpowder works, artificial silk works, etc., which consists in bringing said air into intimate and systematic contact with dilute sulfuric acid, whereby said vapors are absorbed, forming an emulsion of the mixture of acid and vapors with compressed air for raising said mixture continuously to a device wherein the air is separated from said mixture by gravity, allowing said mixture to flow by gravity into a heater wherein the greater portion of the ether and alcohol vapors is separated from the acid, which latter is also slightly concentrated, neutralizing and condensing said vapors for subsequent fractionation by rectification, cooling the separated acid which still contains a certain amount of ether and alcohol, returning said acid in a regulated quantity into contact with air from which it is desired to recover the ether and alcohol vapors, varying at will the relative proportions of ether and alcohol in the recovered mixture by regulating the degree of dilution of the absorbing acid, and regulating the volume of air taken from each workroom for treatment for recovery of its contained ether and alcohol according to its percentage of contained ether.

4. In an apparatus for the recovery of ether and alcohol vapors from the air of factories, such as gunpowder works, artificial silk works, etc., the combination of a suction device for drawing off said air, an absorption plate-column of acid-proof material, a device for supplying a regulated quantity of dilute sulfuric acid to said absorption plate-column, a scrubber for washing said air after recovery of said vapors, a heater for heating the acid after absorption of said vapors, a tube-device for emulsifying and raising the mixture of acid and vapors, a suplementary heater for separating the greater part of said vapors from said acid by heating, a saturator for ether, alcohol and water vapors, a condenser for condensing said vapors, and a cooler for cooling the separated acid before returning same to said absorber.

5. In an apparatus for the recovery of ether and alcohol vapors from the air of factories, such as gunpowder works, artificial silk works, etc., the combination of a suction device for drawing off said air, an absorption plate-column of acid-proof material, a device for supplying a regulated quantity of dilute sulfuric acid to said absorption plate-column, a scrubber for washing said air after recovery of said vapors, a heater for heating the acid after absorption of said vapors, a compressed air tube-device for emulsifying and raising the mixture of acid and vapors to the higher stage, a heater for heating said mixture for separating the greater portion of said vapors and water from said acid and effecting a suitable concentration of said acid, a saturator for saturating and a condenser for condensing said vapors, and a cooler for cooling said acid before returning it to the absorber.

In testimony whereof I have signed my name to this specification.

EMILE AUGUSTIN BARBET.

Witnesses:
 TRACY LAY,
 LUCIEN PAILLARD.